US007610864B2

(12) United States Patent
LaMarche, II et al.

(10) Patent No.: US 7,610,864 B2
(45) Date of Patent: Nov. 3, 2009

(54) SUPPORT TABLE ASSEMBLY FOR FOOD PRODUCT BREADING MACHINE

(75) Inventors: John H. D. LaMarche, II, Vermilion, OH (US); Jason Alexander Sukey, Grafton, OH (US); Scott M. Muniga, Oberlin, OH (US); Jeffrey A. Whited, Amherst, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 0 days.

(21) Appl. No.: 11/409,757

(22) Filed: Apr. 24, 2006

(65) Prior Publication Data

US 2007/0245905 A1 Oct. 25, 2007

(51) Int. Cl.
*A47B 57/00* (2006.01)

(52) U.S. Cl. .................. 108/93; 108/143; 108/50.11; 312/249.9

(58) Field of Classification Search ............. 108/91, 108/92, 93, 143, 137, 69, 50.11, 26, 25, 70, 108/73, 59, 17; 312/282, 273, 277, 280, 312/249.9, 49.8, 292
See application file for complete search history.

(56) References Cited

U.S. PATENT DOCUMENTS

| 57,209 | A | * | 8/1866 | Staples | 108/26 |
|---|---|---|---|---|---|
| 119,208 | A | * | 9/1871 | Welteck | 108/26 |
| 180,908 | A | * | 8/1876 | Nelson | 108/93 |
| 349,875 | A | * | 9/1886 | Crocker | 108/93 |
| 499,674 | A | * | 6/1893 | Grossman | 108/93 |
| 566,197 | A | * | 8/1896 | Link | 108/26 |
| 617,021 | A | * | 1/1899 | Hunt | 312/282 |
| 1,597,086 | A | * | 8/1926 | Lutz | 108/93 |
| 1,817,878 | A | * | 8/1931 | Clements, Jr. | 108/93 |
| 2,123,687 | A | * | 7/1938 | Wells | 108/93 |
| 2,419,766 | A | * | 4/1947 | Domash | 312/282 |
| 2,614,017 | A | * | 10/1952 | Mugnier | 312/196 |
| 2,666,679 | A | * | 1/1954 | Olofsson | 312/282 |
| 2,696,246 | A | * | 12/1954 | Putnam | 108/93 |
| 2,722,287 | A | * | 11/1955 | Beinhorn | 186/45 |
| 2,988,413 | A | * | 6/1961 | Bergen | 108/93 |
| 3,044,197 | A | * | 7/1962 | Cook | 108/97 |
| 3,181,253 | A | * | 5/1965 | Candreva et al. | 434/314 |
| 4,279,453 | A | * | 7/1981 | Haas | 312/282 |
| 4,893,885 | A | * | 1/1990 | Borello | 312/282 |
| 5,666,887 | A | * | 9/1997 | Grabowski et al. | 108/91 |
| 6,003,452 | A | * | 12/1999 | Moore | 108/92 |

* cited by examiner

*Primary Examiner*—José V Chen
(74) *Attorney, Agent, or Firm*—Tarolli, Sundheim, Covell & Tummino LLP (57) ABSTRACT

A support table assembly for a food product breading machine. The support table assembly includes a support table defining an upper support surface for supporting a breading machine, a guide coupled to the support table assembly and a slide assembly that is slidable beneath the support table along the guide between a first and a second position. The slide assembly defines an opening sized to receive a lug. In the first position of the slide assembly, the finished product lug is aligned with a first end of the breading machine such that finished products discharged from the breading machine drop into the lug and, in the second position of the slide assembly, the lug is aligned with a second end of the breading machine such that materials discharged from the breading machine during a cleaning operation drop into the lug.

19 Claims, 11 Drawing Sheets

SUPPORT TABLE ASSEMBLY FOR FOOD PRODUCT BREADING MACHINE

FIELD OF THE INVENTION

The present invention relates to a support table assembly for a food product breading machine and, more particularly, to a support table assembly for a food product breading machine including a support table and a slide assembly coupled to the support table that supports a breading lug in a selected one of two positions, one position for receiving finished products from the food product breading machine and a second position for receiving discharged material from the breading machine during a cleaning operation.

BACKGROUND OF THE INVENTION

Food product breading machines are widely used in restaurants and food processing industry to coat food items such as chicken tenders, fish filets, onion rings, etc., with breading and/or batter prior to frying or baking the items. An example of a food product breading machine is disclosed in U.S. Pat. No. 6,244,170, issued on Jun. 12, 2001 to Whited. The '170 patent is assigned to the assignee of the present invention and is incorporated herein in its entirety by reference. The '170 patent discloses a breading/battering machine that provides a battering unit disposed vertically above breading unit. The product follows a generally horizontal C-shaped path. The raw product is input at a first end of the machine and moves generally horizontally through the upper battering unit toward an opposite, second or back end of the machine. After completion of battering the product is conveyed downwardly to the breading unit. The product moves generally horizontally through the breading unit back toward the first end where the finished product is discharged from the machine.

Another food product breading machine is disclosed in U.S. patent application Ser. No. 11/235,299, filed Sep. 26, 2005 to Muniga, Whited & Bettcher. The '299 application is also assigned to the assignee of the present invention and is incorporated herein in its entirety by reference. The '299 application discloses a high volume breading/battering machine having two parallel breading/battering units driven by a drive unit positioned between the two units.

Generally, breading machines are placed on a flat support table. The finished products are discharged into a breading lug, commonly referred to in the industry as a lug or bus tub, positioned near the product discharge first end of the breading machine. Depending on the food item being processed, a perforated metal basket may be supported within the lug with the finished product being discharged into the basket. This may be done, for example, so that excess breading or grease may drip off the finished product falling through openings in the basket into the lug as the finished product sits in the basket.

Typically, the lug is placed in a lug cart which can be wheeled from the breading machine when the lug is full or sufficient finished product has been produced by the breading machine. Additionally, at periodic intervals, the breading machine must be cleaned which involves cleaning out the breading in a breading reservoir of the breading unit. Typically, access to the breading reservoir is from the second or back end of the breading machine. Again, a lug placed in a lug cart is used to catch the breading during the cleaning operation.

The support table poses a number of difficulties. The table must be sturdy enough to support the significant weight of the breading machine. In breading machines used in restaurants, space is typically very limited and the breading machine will be placed with the second or back end against a wall. When cleaning the machine, the support table (with the breading machine positioned on the table) must be pulled away from the wall to access the back end of the machine. Pulling a table across the floor stresses the legs of the table.

Utilizing the lug carts is also problematic. The lug carts are often top heavy and pose a tipping hazard. Because the carts are wheeled, they also tend to move easily when bumped or jostled or simply from vibration of the breading machine. If the cart moves, finished product can miss the lug and fall onto the floor, thereby increasing waste and posing a slipping hazard. Further, when a lug is full, an employee has to bend over and remove the lug from the cart. This exposes the employee to back strain from lifting a heavy lug from the low height of the cart. Finally, lug carts do not provide a surface surrounding the lugs to direct material into the lug. This is especially problematic with respect to cleaning out the breading from the breading machine. Because the support table is generally wider than the lug and the lug cart, breading often spills from the machine and table over the sides of the lug and the lug cart resulting in breading falling on the floor and causing an unsanitary work area. Employees sometimes improvise with a sheet pan propped against the back end of the breading machine to direct the breading from the machine to the lug, which requires additional work and slows the cleaning process. Additionally, the sheet pan then also has to be cleaned and stored.

What is needed is a support table assembly for supporting a breading machine that provides a stable support surface for the machine, is easily movable to facilitate cleaning and that locks into position upon being moved to a desired position. What is also desired is a support table assembly that provides an efficient width for cleaning the machine and that provides a support structure for supporting a lug at the first, finished product end of the breading machine for receiving finished products and at the second, back end of the breading machine for receiving discharge material, such as breading or flour, from the machine during a cleaning operation, all without the need for lug carts.

SUMMARY OF THE INVENTION

The present invention concerns a support table assembly for a food product breading machine. In one aspect, the present invention concerns a support table assembly including a support table having an upper support surface for supporting a breading machine, a guide coupled to the support table and a slide assembly that is slidable beneath the support table along the guide between a first and a second position. The slide assembly supports a tub-shaped lug. In the first position of the slide assembly, the lug is aligned with a first end of the breading machine such that finished products discharged from the breading machine drop into the lug and, in the second position of the slide assembly, the lug is aligned with a second end of the breading machine such that materials discharged from the breading machine during a cleaning operation drop into the lug.

In one exemplary embodiment, the slide assembly includes a frame defining an opening which removably receives the lug and a support extending downwardly from the frame to a floor. A distal end of the support includes one or more casters to facilitate sliding of the slide assembly. At least one of the one or more casters is lockable to permit movement of the slide assembly when the caster is in an unlocked position and impeding movement of the slide assembly when the caster is in a locked position.

These and other objects, advantages, and features of the exemplary embodiment of the invention are described in detail in conjunction with the accompanying drawings.

DETAILED DESCRIPTION

Figure 1:
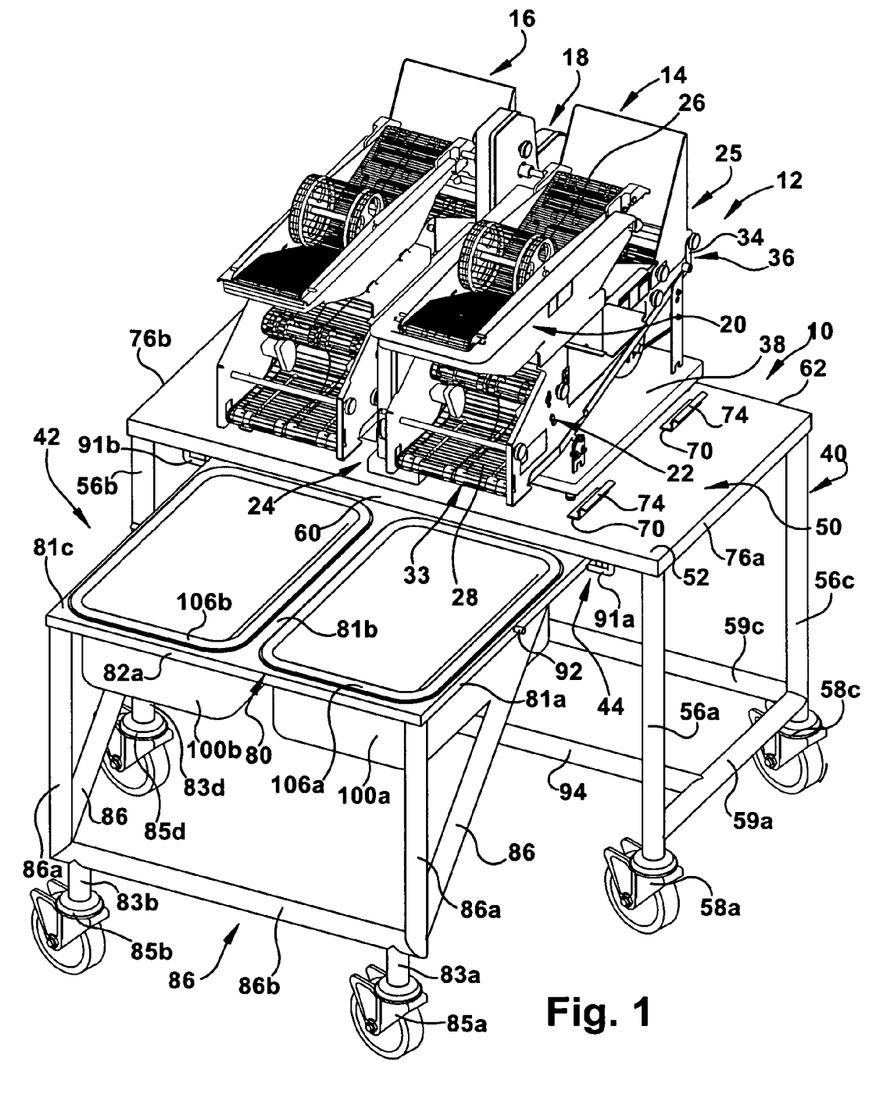
FIG. 1 is a perspective view of the support table assembly of the present invention supporting a food product breading machine with a slide assembly in a food product receiving position.
Figure 2:
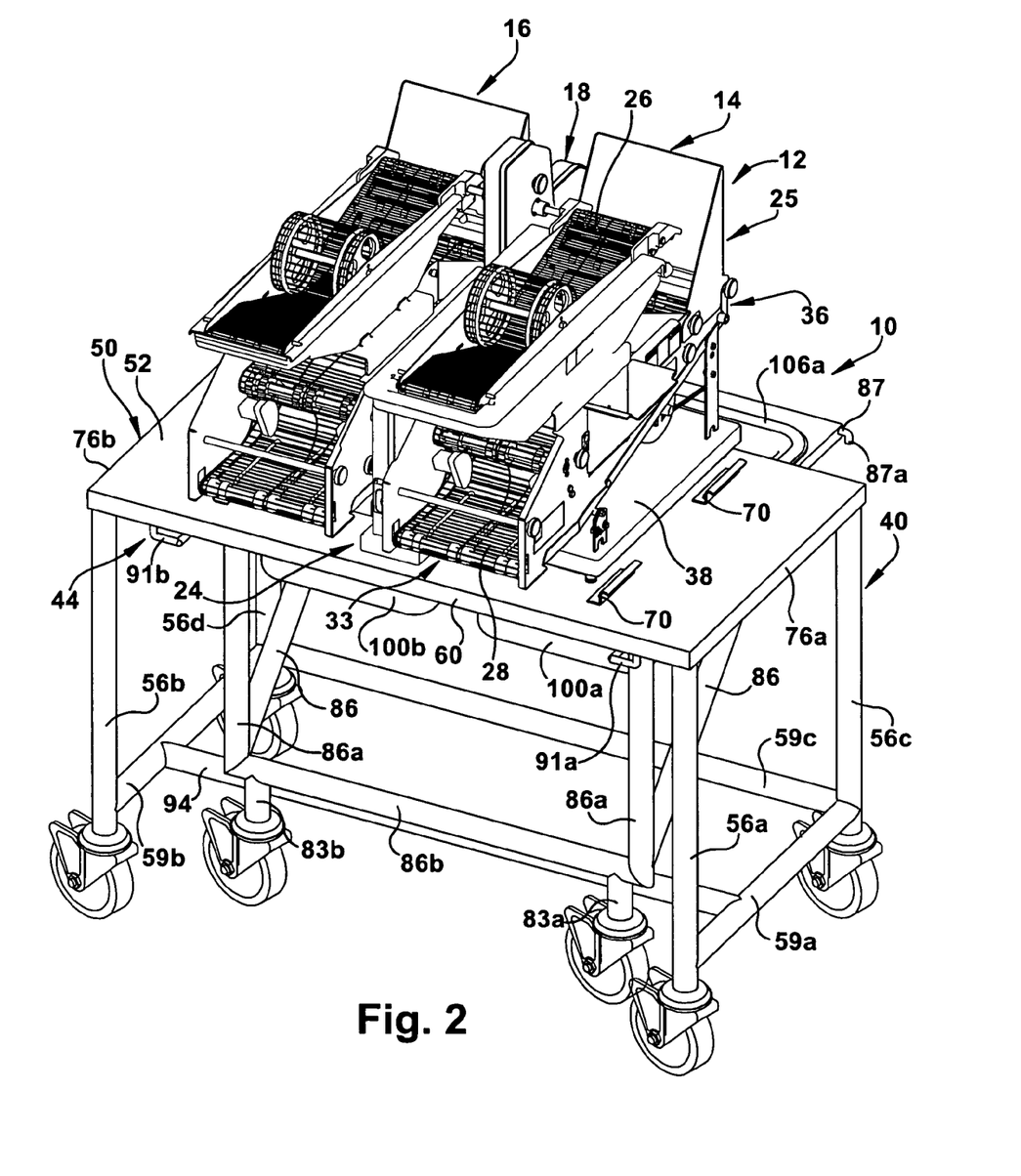
FIG. 2 is a perspective view of support table assembly of FIG. 1 with the slide assembly in a material discharge receiving position.

A support table assembly of the present invention is shown generally at 10 in FIGS. 1 and 2. The support table assembly 10 is adapted to support a food product breading machine 12. The food product breading machine 12 shown in FIGS. 1-6 is a high volume breading and battering machine that includes two parallel breading and battering units 14, 16 whose conveyors are driven by a central drive mechanism 18 located between the two units. It should be understood that the support table assembly 10 of the present invention is not limited to any particular style or configuration of breading machine. Rather, as would be recognized by one of skill in the art, the support table assembly 10 of the present can be modified to fit the size and configuration of any breading machine and is equally applicable to breading machines that include battering units as well as those that do not include battering units.

The structure and operation of the two parallel breading/battering units 14, 16 are substantially identical, for brevity, the unit 14 will be described with the understanding that the description equally applies to the unit 16. The food products to be processed follow a generally C-shaped path of travel through the unit 14 which includes an upper battering unit or tank 20 mounted on a lower breading unit 22. The two battering units 20 look slightly different because one unit is a chilled battering tank and the other unit is a normal battering tank. Food products to be battered and breaded are deposited near a first or front end 24 of the unit 14. During processing, the products travel toward a second or back end 25 of the unit 14. When processing is complete, the finished products are discharged near the front end 24 of the unit 14. Specifically, referring to FIG. 5, food products are dropped onto a battering conveyor 26 of the battering unit 20 at point A. After being submerged in a bath of batter, the food products exit the battering conveyor 26 at point B and fall onto a breading conveyor 28 of the breading unit 22 at point C. The products are immersed in breading as they travel along the breading conveyor 28. The completed products are then discharged from the breading conveyor 28 at point D near a front end 33 of the breading unit 22. The discharged finished products from the units 12, 14 drop into a respective one Qf two lugs 100a, 100b which are aligned with the respective front ends 33 of the breading units 22 (shown in FIG. 1). The lugs 100a, 100b, sometimes referred to as breading lugs or bustubs are tub-shaped containers, normally fabricated of high impact plastic, that receive the finished products. As used herein "lug" shall be defined as a container or tub for receiving finished products.

Periodically, the unit 14 needs to be cleaned. Part of the cleaning process involves having material, such as breading, stored in a reservoir 30 of the breading unit 22 removed from the unit 14. The breading reservoir 30 is located in a bottom portion of the breading unit 22. In addition to breading, during operation other materials such as pieces of batter and pieces of the product being processed (pieces of meat ) that have become dislodged during processing accumulate in the reservoir 30. To clean out the reservoir 30, a back plate 34 of the breading unit 22 is removed and the breading conveyor 28 is run. Since the breading conveyor 28 travels in a counterclockwise direction as viewed in FIGS. 4 and 5, removing the back plate 34 causes the material in the reservoir 30 to be discharged outwardly from a back end 36 of the breading unit 22. The lugs 100a, 100b will be positioned in alignment with the back ends 36 of the respective breading units 22 to receive the discharged breading and other materials (shown in FIG. 2).

Figure 9:
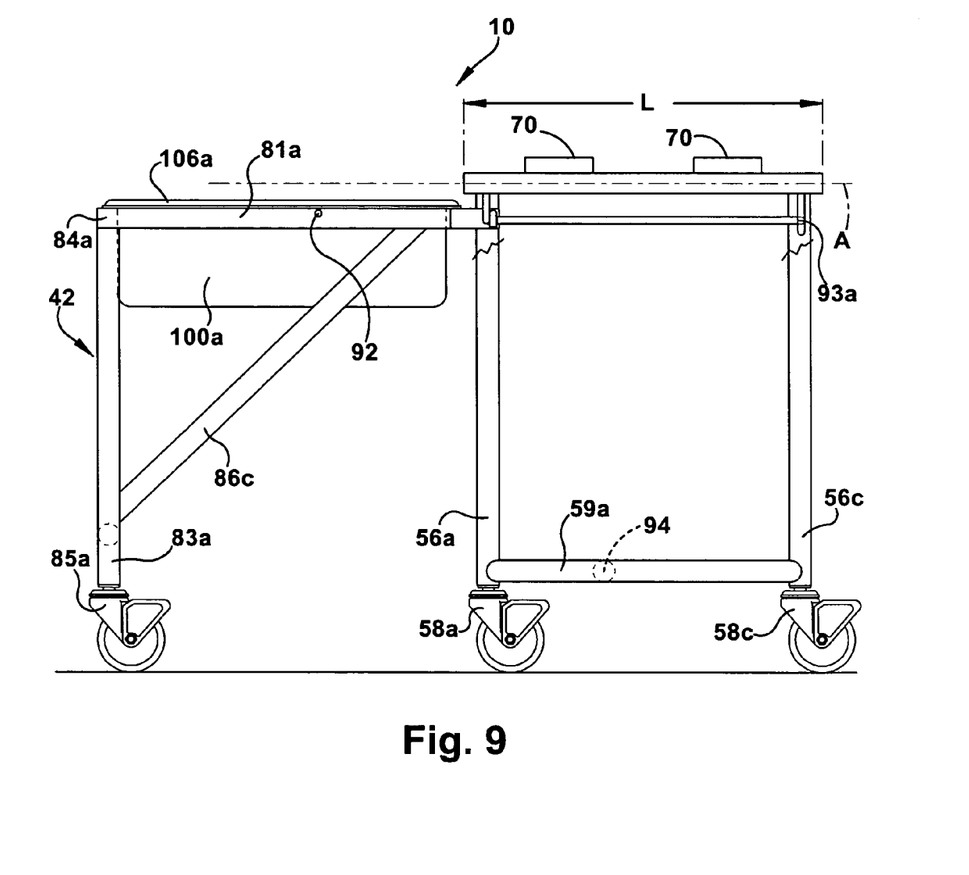
FIG. 9 is a side elevation view of the support table assembly of FIG. 1 with the breading machine removed with the slide assembly in a food product receiving position.

The support table assembly 10 of the present invention includes an upright table 40 for supporting the breading machine 12 and a slide assembly 42 that slides along a guide 44 such that the slide assembly 42 may be moved with respect to the table 40 between a first position (shown in FIGS. 1, 5 and 9) to receive finished product from the breading unit 22 and a second position (shown in FIGS. 2, 6 and 10) to receive discharged materials from the reservoir 30 during a cleaning operation.

Figure 10:
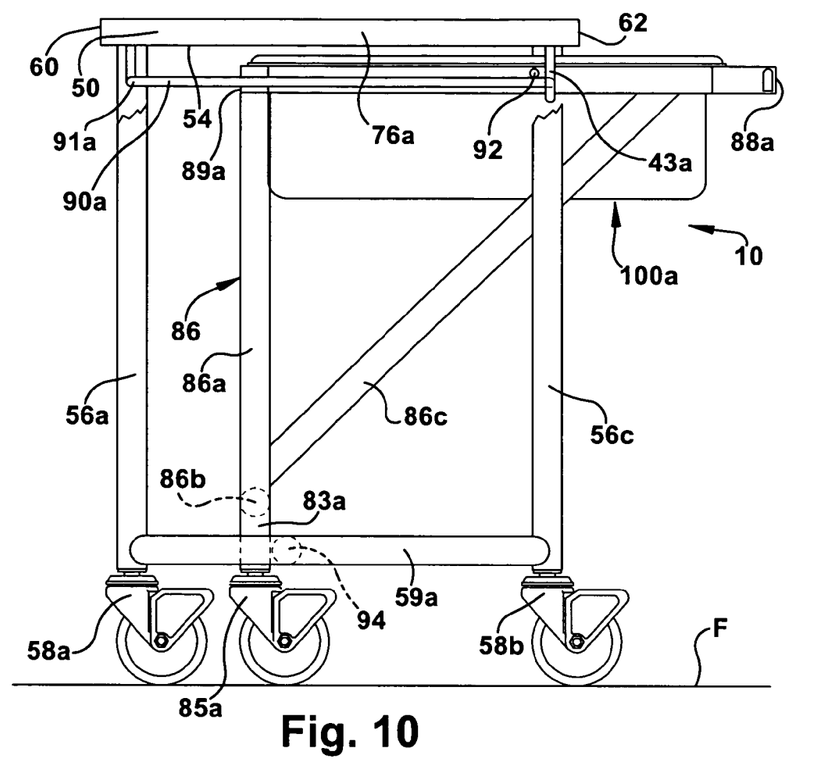
FIG. 10 is a side elevation view of the support table assembly of FIG. 1 with the breading machine removed with the slide assembly in a material discharge receiving position.

The table 40 is preferably fabricated of sheet metal for durability and ease of cleaning and includes tabletop 50 defining a planar upper support surface 52 and a lower surface 54. Four tubular legs 56a, 56b, 56c, 56d are affixed to and extend downwardly from the tabletop 50 to support the tabletop 50. To facilitate moving the table 40 to access the back end 25 of the unit 14, casters 58a, 58b, 58c, 58d are affixed to a lower end of each leg 56a, 56b, 56c, 56c and contact a floor surface F (FIG. 10).

Advantageously, the front two casters 58a, 58b are locking casters that may be unlocked to move the table 40 and locked when the breading machine 12 is in operation to avoid undesirable movement of the table due to bumping, vibration, etc. For extra strength and stability, horizontal tubular members 59a, 59b extend between legs 56a, 56b and between legs 56b, 56d, respectively, while horizontal tubular member 59c extends between legs 56c, 56d.

Figure 5:
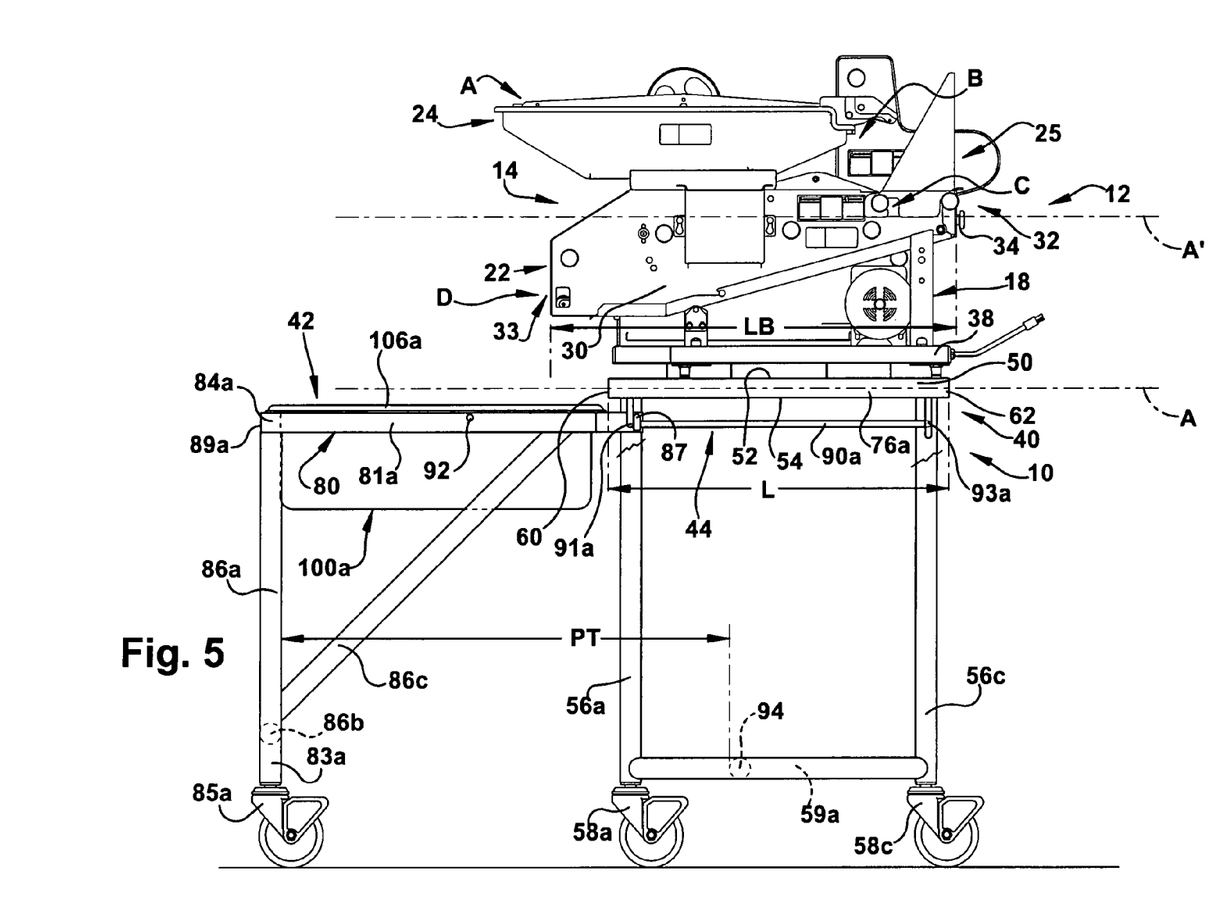
FIG. 5 is a side elevation view of the support table assembly and food product breading machine of FIG. 1 with the slide assembly in a food product receiving position.
Figure 6:
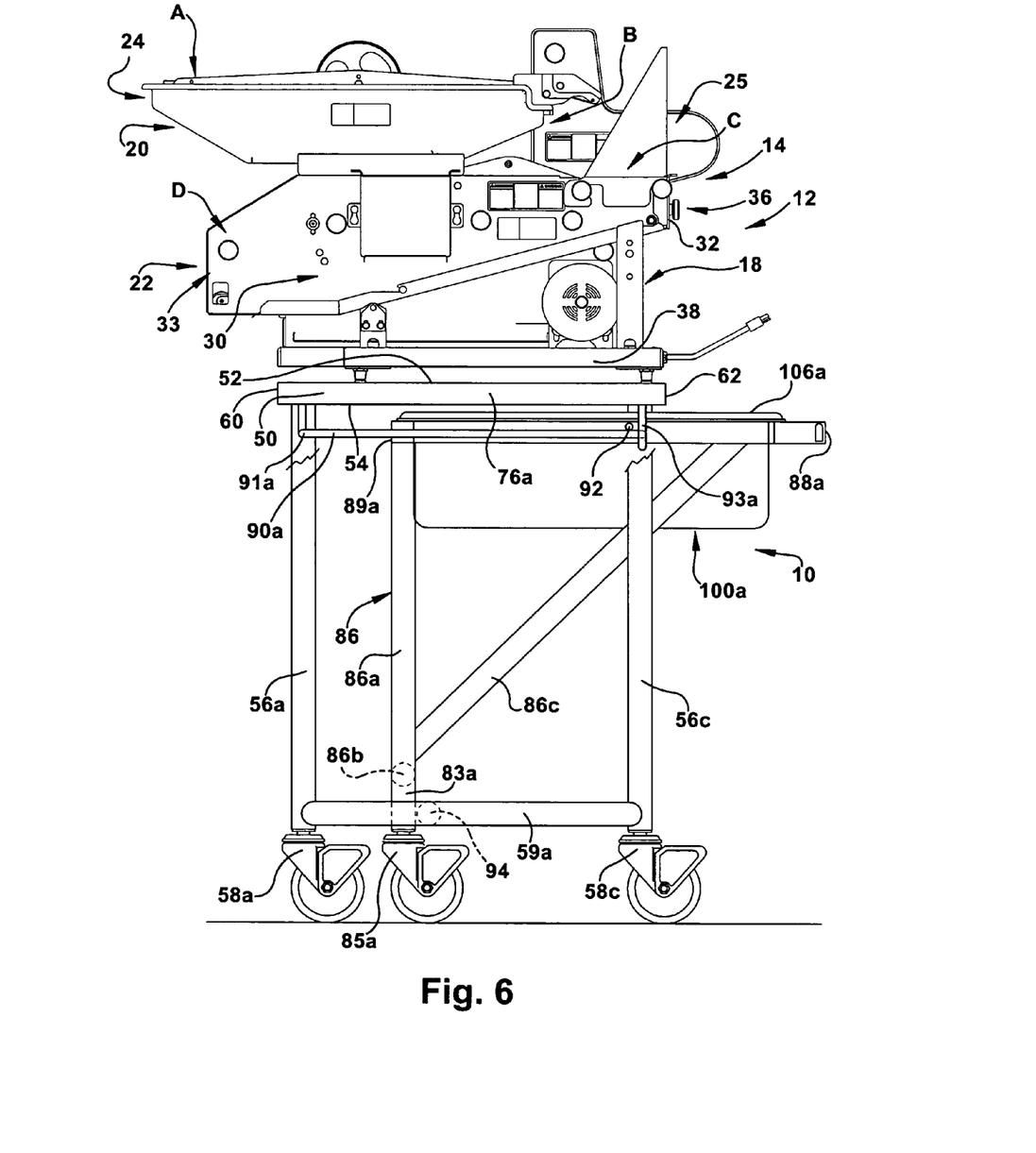
FIG. 6 is a side elevation view of the support table assembly and food product breading machine of FIG. 1 with the slide assembly in a material discharge receiving position.

As can best be seen in FIG. 5, the tabletop 50 is configured such that a length L of the tabletop 50 along a longitudinal axis A of the table 40 is somewhat less than a length LB of the breading unit 22 along its longitudinal axis A' such that when the finished products are discharged from the front end 33 (FIG. 5) the breading unit 22, the products do not hit a front edge 60 of the tabletop 50, but rather fall into a respective one of the two lugs 100a, 100b supported by the slide assembly 42. Similarly, the back end 36 of the breading unit 22 is even with or extends just beyond a back edge 62 of the tabletop 50 such that the material discharged from the breading reservoir 30 during a cleaning operation fall into a respective one of the two lugs 100a, 100b rather than onto the tabletop 50 (FIG. 6).

Figure 7:
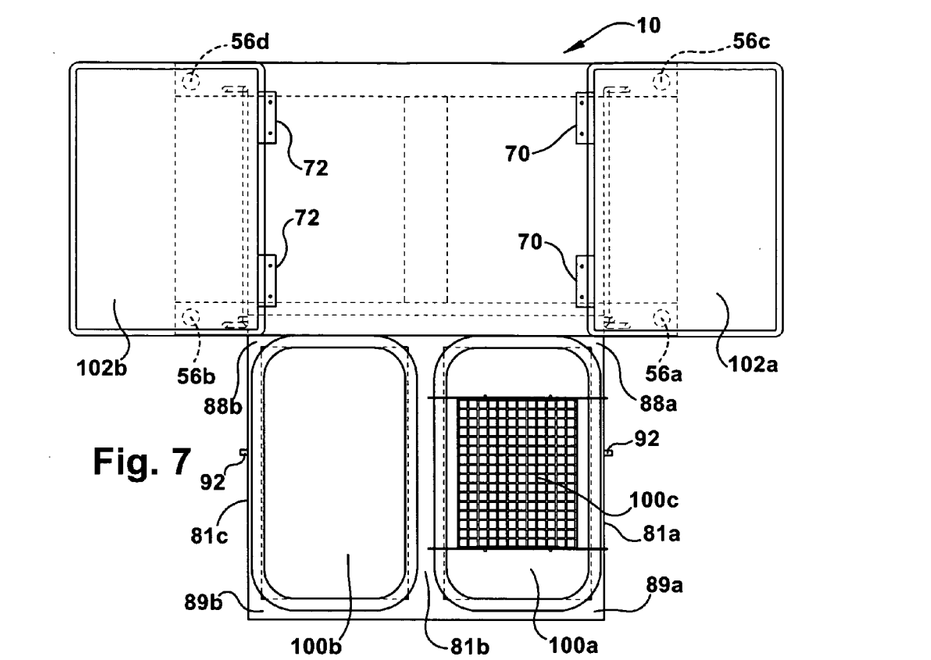
FIG. 7 is a top plan view elevation of the support table assembly of FIG. 1 with the breading machine removed.
Figure 11:
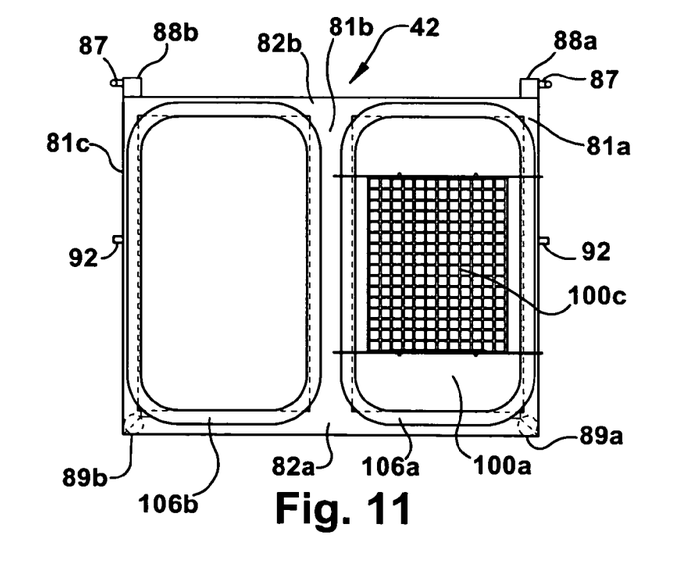
FIG. 11 is a top plan view of the slide assembly.

The breading machine 12 is positioned on the tabletop 50 such that a longitudinal axis A' of the breading machine 12 is substantially parallel to the longitudinal axis A of the table 40 and the breading machine is centered on the table 40 with respect to a width w of the tabletop 50. The finished products may fall into the lugs 100a, 100b or, depending on the nature of the product, a removable perforated basket 100c may be installed in one or both lugs to catch the finished products and allow excess batter and/or breading to drop through perforations in the basket and/or allow grease to drain prior to removal of the finished products. A perforated basket 100c is shown in FIGS. 7 and 11.

Figure 3:
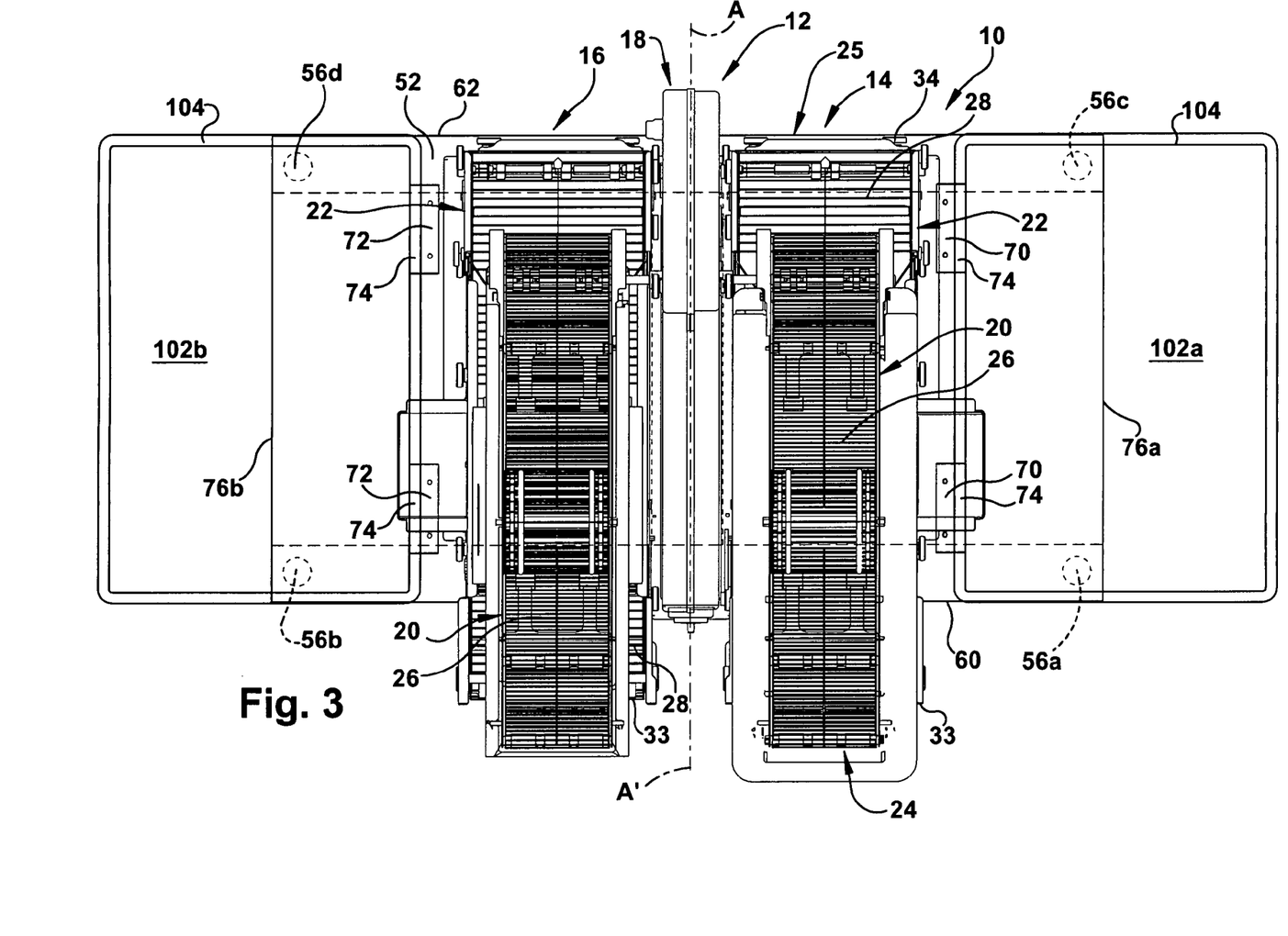
FIG. 3 is a top plan view of the support table assembly and food product breading machine of FIG. 1.
Figure 4:
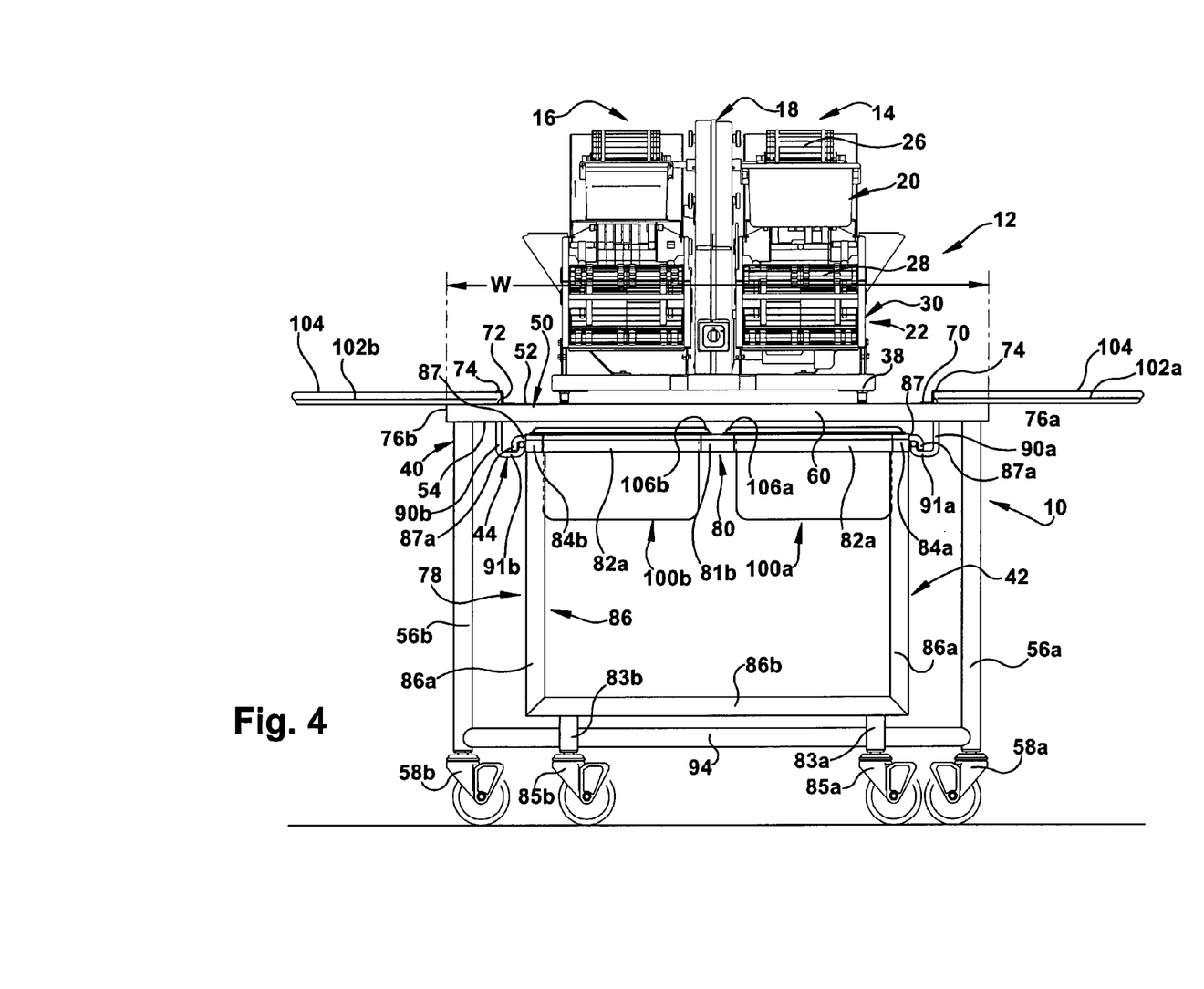
FIG. 4 is a front elevation view of the support table assembly and food product breading machine of FIG. 1.
Figure 8:
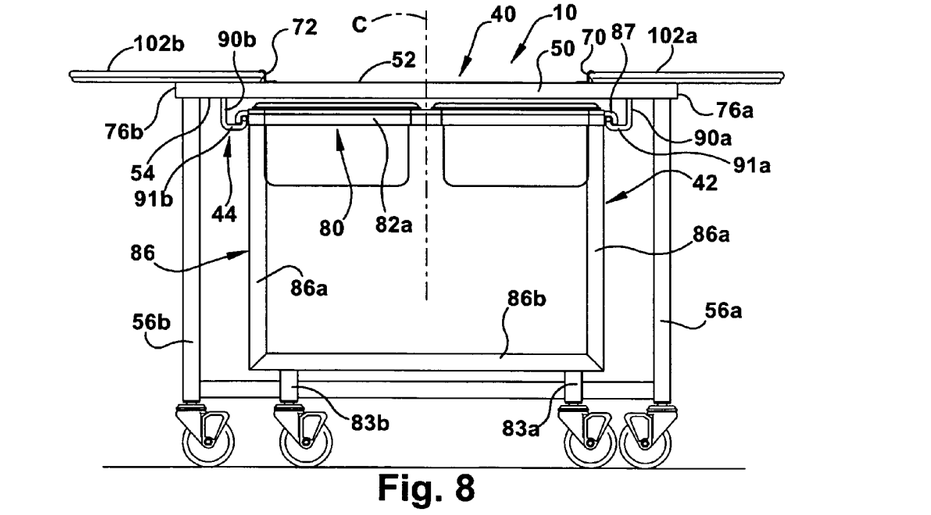
FIG. 8 is a front elevation view of the support table assembly of FIG. 1 with the breading machine removed.

Advantageously, the upper surface 52 of the tabletop 50 includes two pair of flanges 70, 72, one pair on each side of a horizontal center C (FIG. 8) of the tabletop. The flanges 70, 72 are aligned parallel to the longitudinal axis A of the table 40 and extend upwardly from the tabletop 50. The flanges 70, 72 are spaced laterally from a base 38 of the breading machine 12. The flanges 70, 72 include upper horizontally extending shoulders 74. The flanges 70, 72 hold sheet pans 102a, 102b that are used to hold a batch of raw products prior to dropping the products onto the battering conveyor 26. The shoulders 74 have a slight hook at their distal ends to firmly hold the sheet pans 102a, 102b in place against the tabletop 50 by bearing against an upper rim 104 of the sheet pans. After loading of raw product is complete, the sheet pans 102a, 102b may be easily removed by simply pivoting an end of the sheet pan not supported by the tabletop 50 upwardly such that the upper rim 104 of the sheet pan clears the flange shoulder 74. As can be seen in FIGS. 3 and 4, when the sheet pans 102a, 102b are in place, they extend laterally beyond the side edges 76a, 76b of the table 40.

Figure 12:
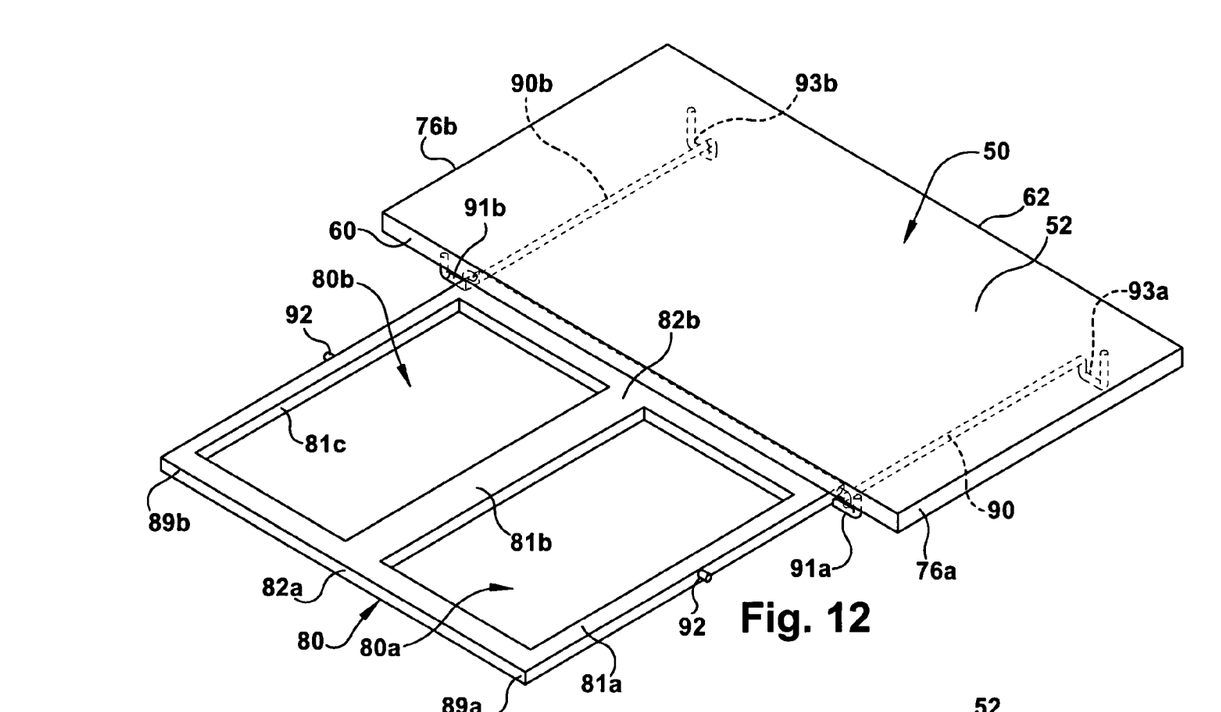
FIG. 12 is a perspective view of a guide of the support table assembly and a frame of the slide assembly in the food receiving position.
Figure 13:
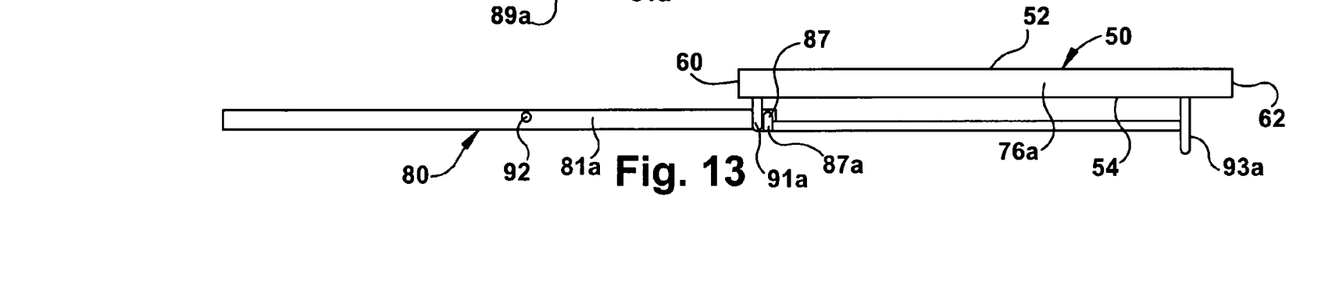
FIG. 13 is a side elevation view of the guide and frame of FIG. 12.

The table legs 56a, 56b, 56c, 56d and the tabletop 50 define a central opening 78 that receives the slide assembly 42 and permits its movement along a path of travel PT (FIG. 5) that is substantially parallel to the longitudinal axis A of the table 40. The slide assembly 42 includes a steel frame 80 which is configured to define a pair of openings 80a, 80b (best seen in FIGS. 12 and 14) that receive the lugs 100a, 100b in horizontal, spaced apart relationship such that the lugs are vertically aligned with the respective breading conveyors 28 of the units 14, 16 when the slide assembly 42 is in the first position so that the finished products fall into the respective lugs 102a, 102b. The frame 80 includes three parallel longitudinal members 81a, 81b, 81c which are bridged by cross members 82a, 82b. The outer and middle longitudinal members 81a, 81b and the cross members 82a, 82b define a support surface for an outer rim 106a of the lug 100a, while the middle and outer longitudinal members 81b, 81c and the cross member 82a, 82b define a support surface for the outer rim 106b of the lug 100b to securely support the respective lugs in the slide assembly 42. Given the near tabletop height of the lugs 100a, 100b in the frame 80, removing of the lugs when full of product is facilitated since the employee does not have to bend over as far as when prior art lug carts were used.

Advantageously, the strength and ease of movement of the slide assembly 42 is greatly enhanced by a vertical, U-shaped tubular support 86 which helps support the frame 80 and a pair of wheeled legs 83a, 83b extending downwardly from a U-shaped tubular support 86. The wheeled legs 83a, 83b contact the floor surface F. The U-shaped tubular support 86 includes a pair of vertical members 86a that extend downwardly from respective front corners 84a, 84b of the frame 80. The U-shaped tubular support 86 includes a horizontal cross member 86c bridging the vertical members 86a. The legs 83a, 83b extend downwardly from the cross member 86c. Rigidity and strength of the slide assembly 42 is further enhanced by a pair of angled supports 86c extending between the vertical members 86a and the outer longitudinal member 81a, 81c of the frame 80.

Lockable casters 85a, 85b are affixed to distal ends of the legs 83a, 83b. The U-shaped tubular support 86, including the legs 83a, 83b, provide support to the frame 80, which is the first position, is subject to considerable torque from the weight of the finished products in the lugs 100a, 100b. The lockable casters 85a, 85b, when unlocked, provide easy movement of the slide assembly 42 when it is desired to move the slide assembly 42 between the first and second positions or between the first and an intermediate position. An intermediate position, between the first and second positions, may be necessary if, for example, in the first position, a lug is filling unevenly with more product being deposited at an end of the lug nearest the table 40 and little or no product being deposited at an opposite end of the lug. An employee may push the slide assembly 42 from the first position inwardly a bit to insure that the lug is being filled evenly. When locked, the lockable casters 85a, 85b insure that the slide assembly 42 is stationary during operation of the breading machine 12.

The movement of the slide assembly 42 with respect to the table 40 is constrained by the guide 44 affixed to the bottom 54 of the tabletop 50. The guide 44 includes two parallel rails 90a, 90b. A pair of supports 87 extends from the outer longitudinal members 81a, 81c of the frame 80 near a back end 88a, 88b of the longitudinal members 81a, 81c. In one exemplary embodiment, the pair of supports 87 includes a pair of posts that extend laterally outwardly from the longitudinal members 81a, 81c. It should be understood that other types of supports known to those of skill in the art could be utilized, such as, for example, rollers coupled to the longitudinal members 81a, 81c. The posts 87 ride on the rails 90a, 90b to allow sliding movement of the slide assembly 42 with respect to the table 40. Advantageously, because the posts 87 include downwardly extending arms 87a which extend just outwardly of the rails 90a, 90b, undesirable lateral movement of the slide assembly 42 is limited.

When the slide assembly 42 is in the first position, the downwardly extending arms 87a of the posts 87 abut forward horizontal portions 91a, 91b of the rails 90a, 90b to prevent the slide assembly 42 from being inadvertently pulled too far forwardly and completely way from the table 40. If it is actually desired to remove the slide assembly 42 from the table 40 for cleaning or other purposes, this is easily accomplished by pushing down on the front cross member 82a of the frame 80 such that the rear of the frame 80 pivots upwardly thereby raising the downwardly extending arms 87a of the posts 87 out of engagement with the forward horizontal portions 91a, 9b of the guide rails 90a, 90b.

Figure 14:
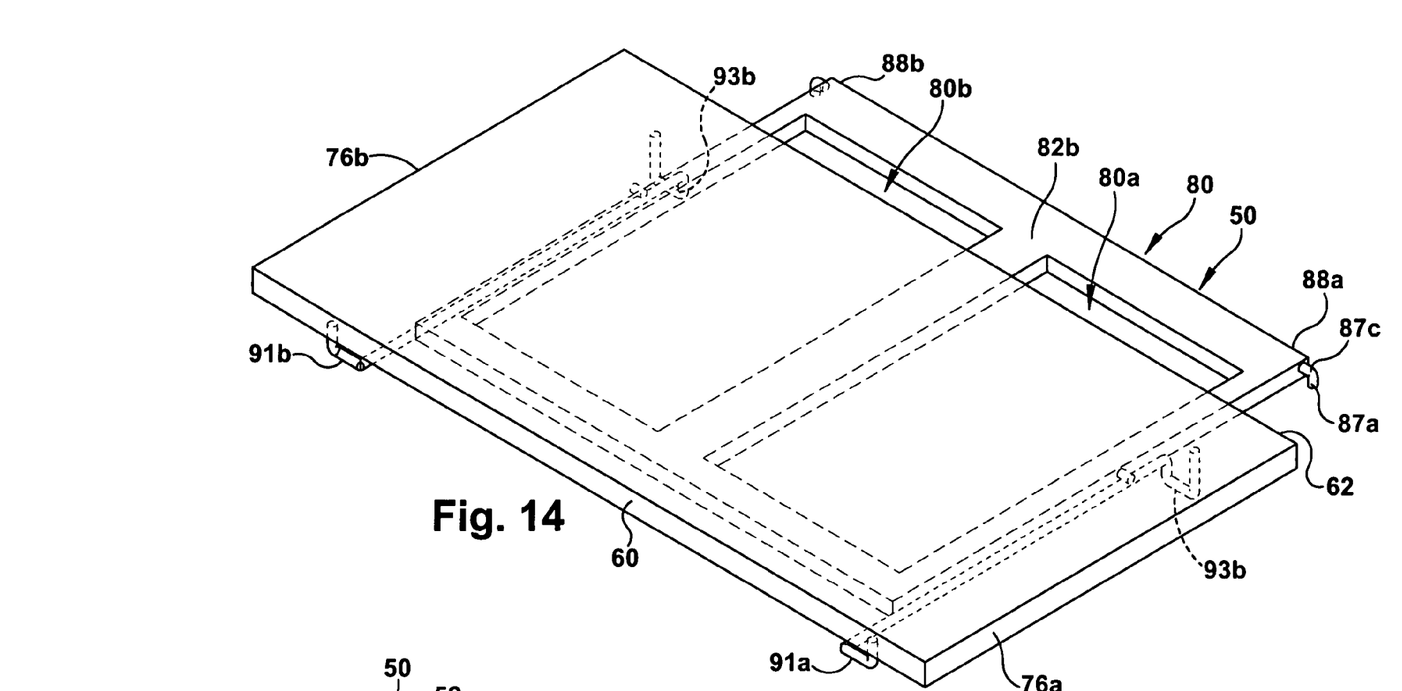
FIG. 14 is a perspective view of a guide of the support table assembly and a frame of the slide assembly in the material discharge receiving position.
Figure 15:
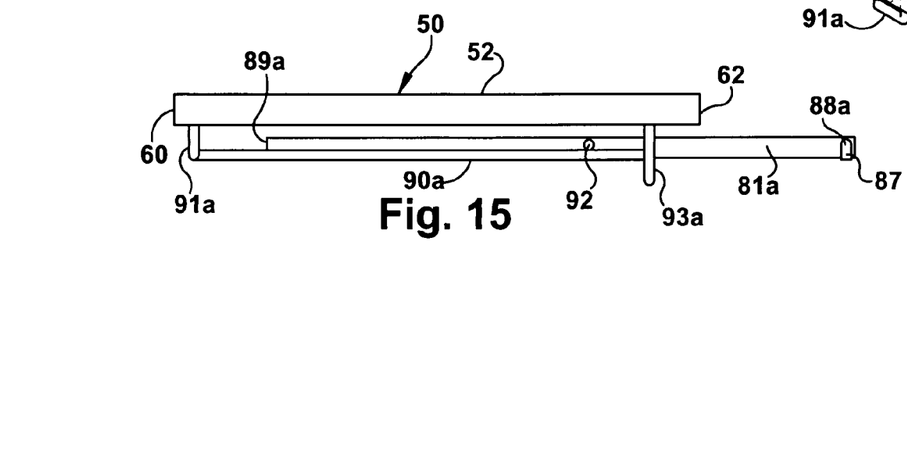
FIG. 15 is a side elevation view of the guide and frame of FIG. 14.

The outer longitudinal members 81a, 81c also include a second pair of supports 92 that extend from the members 81a, 81c. In one exemplary embodiment, the second pair of supports 92 includes a pair of posts that extend laterally outwardly from the longitudinal members 81a, 81c. It should be understood that other types of supports known to those of skill in the art could be utilized, such as, for example, rollers coupled to the longitudinal members 81a, 81c. The posts 92 are positioned about ⅓ of the distance along the members 81a, 81c from the back 88a, 88b to front 89a, 89b. The posts 92 function to slidably support the frame 80 as the slide assembly 42 is moved to the second position. As is best seen in FIGS. 14 and 15, as the slide assembly 42 moves to the second position, the first posts 87 will pass beyond rearward end portions 93a, 93b of the rails 90a, 90b and, therefore, no longer support the slide assembly 42. The support of the slide assembly 42 and the sliding action between the slide assembly 42 and rails 90a, 90b in the second position is provided by the second posts 92 riding on the rails 90a, 90b. Of course, the U-shaped support 86 and extending legs 83a, 83b also support the slide assembly 42 in both the first and second positions.

To prevent the slide assembly 42 from moving too far rearwardly as the slide assembly 42 is moved to the second position, a lower, horizontal tubular cross member 94 is provided that extends between the front table legs 56a, 56b. As the slide assembly 42 is moved rearwardly, the legs 83a, 83b of the slide assembly 42 move toward and ultimately contact the cross member 94 providing a positive stop and preventing further rearward movement of the slide assembly 42 with respect to the table 40.

While the present invention has been described with a degree of particularity, it is the intent that the invention includes all modifications and alterations from the disclosed design falling with the spirit or scope of the appended claims.

We claim:

1. A support table assembly for a food product breading machine comprising:
   a) a support table defining an upper support surface including a front end and a spaced apart back end separated by spaced apart first and second sides, the support table having a length extending along a longitudinal axis substantially orthogonal to the front end of the support table;
   b) a guide coupled to and extending below an underside of the support table, the guide extending substantially parallel to the longitudinal axis of the support table;
   c) a slide assembly disposed below the underside of the support table and slidable beneath the support table along the guide along a path of travel between a first and a second position, the slide assembly supporting a removable lug and including a frame defining an opening sized to receive the removable lug, the slide assembly further including a support extending downwardly from the frame, the support contacting and moving along a surface of the floor on which the support assembly is disposed to facilitate sliding of the slide assembly;
   d) in the first position of the slide assembly, at least a portion of the lug extending beyond the front end of the support table; and
   e) in the second position of the slide assembly, at least a portion of the lug extending beyond the back end of the support table.

2. The support table assembly of claim 1 wherein the slide assembly includes a frame defining an opening which removably receives the lug, the support extending downwardly from an end of the frame furthest from the support table when the slide assembly is in the first position, and at least one caster affixed to a distal end of the support, the caster being in contact with a surface of a floor on which the support table assembly is disposed to facilitate sliding of the slide assembly.

3. The support table assembly of claim 2 wherein the distal end of the support includes a plurality of legs, each leg having a caster affixed to the leg and each caster being in contact with a surface of the floor.

4. The support table assembly of claim 2 wherein at least one caster is a lockable caster which can be selectively locked to prevent rotation of a wheel of the caster and selectively unlocked to permit rotation of a wheel of the caster.

5. The support table assembly of claim 1 wherein the guide includes a pair of spaced apart rails affixed to the underside of the support table extending substantially parallel to the path of travel of the slide assembly and the slide assembly includes a frame defining an opening for removably supporting the lug, the frame including a first pair of supports extending outwardly from opposite outer surfaces of the frame perpendicular to the path of travel of the slide assembly, each support of the first pair of supports sliding on a respective one of the pair of spaced apart rails during at least a portion of the slide assembly path of travel to facilitate sliding of the slide assembly.

6. The support table assembly of claim 5 wherein the first pair of supports each include a distal portion which extends along an outer side of respective rails of the pair of rails to limit lateral movement of the frame with respect to the pair of rails.

7. The support table assembly of claim 5 wherein the frame includes a second pair of supports extending outwardly from opposite outer surfaces of the frame perpendicular to the path of travel of the slide assembly, each support of the second pair of supports sliding on a respective one of the pair of spaced apart rails during at least a portion of the slide assembly path of travel to facilitate sliding of the slide assembly, the first pair of supports being spaced from the second pair of supports, in the first position, the first pair of supports contacting respective ones of the pair of spaced apart rails and in the second position, the second pair of supports contacting respective ones of the pair of spaced apart rails.

8. The support table assembly of claim 7 wherein at least one caster is a lockable caster which can be selectively locked to prevent rotation of a wheel of the caster and selectively unlocked to permit rotation of a wheel of the caster.

9. The support table assembly of claim 1 wherein the support table includes a tabletop defining the upper support surface and a plurality of legs extending downwardly from the tabletop to support the tabletop, a distal end of each of the plurality of legs including a caster to facilitate moving the support table.

10. The support table assembly of claim 1 wherein a pair of flanges is extends upwardly from the upper support surface, the pair of flanges configured to releasably secure a rim of a sheet pan placed on the upper support surface.

11. The support table assembly of claim 1 wherein the slide assembly defines a plurality of openings and a plurality of removable lugs, each of the plurality of openings sized to receive a respective one of the plurality of removable lugs.

12. A support table assembly in combination with a food product breading machine, the combination comprising:
   a) the support table assembly including a support table including an upper support surface for supporting the food product breading machine, the support table including a front edge and a spaced apart back edge separated by spaced apart first and second side edges, the support table having a length extending along a longitudinal axis substantially orthogonal to the front edge of the support table;

b) a guide coupled to and extending below and underside of the support table, the guide extending substantially parallel to the longitudinal axis of the support table;

c) a slide assembly disposed below the underside of the support table and slidable beneath the support table along the guide along a path of travel between a first and a second position, the slide assembly supporting a removable lug and including a frame defining an opening sized to receive the removable lug, the slide assembly further including a support extending downwardly from the frame, the support contacting and moving along a surface of the floor on which the support assembly is disposed to facilitate sliding of the slide assembly;

d) in the first position of the slide assembly, at least a portion of the lug extending beyond the front edge of the support table and being aligned with a first end of the breading machine such that finished products discharged from the breading machine drop into the lug; and e) in the second position of the slide assembly, at least a portion of the lug extending beyond the back edge of the support table and being aligned with a second end of the breading machine such that materials discharged from the breading machine during a cleaning operation drop into the lug.

13. The support table assembly of claim 12 wherein the slide assembly includes a frame defining an opening which removably receives the lug, the support extending downwardly from an end of the frame furthest from the support table when the slide assembly is in the first position, and at least one caster affixed to a distal end of the support, the caster being in contact with a surface of a floor on which the support table assembly is disposed to facilitate sliding of the slide assembly.

14. The support table assembly of claim 13 wherein the distal end of the support includes a plurality of legs, each leg having a caster affixed to the leg and each caster being in contact with a surface of the floor.

15. The support table assembly of claim 13 wherein at least one caster is a lockable caster which can be selectively locked to prevent rotation of a wheel of the caster and selectively unlocked to permit rotation of a wheel of the caster.

16. The support table assembly of claim 12 wherein the guide includes a pair of spaced apart rails affixed to the underside of the support table extending substantially parallel to the path of travel of the slide assembly and the slide assembly includes a frame defining an opening for removably supporting the lug, the frame including a first pair of supports extending outwardly from opposite outer surfaces of the frame perpendicular to the path of travel of the slide assembly, each support of the first pair of supports sliding on a respective one of the pair of spaced apart rails during at least a portion of the slide assembly path of travel to facilitate sliding of the slide assembly.

17. The support table assembly of claim 12 wherein the slide assembly supports a plurality of removable lugs.

18. A support table assembly comprising:

a) a support table defining an upper support surface including a front end and a spaced apart back end separated by spaced apart first and second sides, the support table having a length extending along a longitudinal axis substantially orthogonal to the front end of the support table;

b) a guide coupled to and extending below an underside of the support table, the guide extending substantially parallel to the longitudinal axis of the support table;

c) a slide assembly disposed below the underside of the support table and slidable under the support table along the guide along a path of travel between a first and a second position, the slide assembly supporting a removable lug, and including a frame the slide assembly further including a support extending downwardly from the frame, the support contacting and moving along a surface of the floor on which the support assembly is disposed to facilitate sliding of the slide assembly;

d) in the first position of the slide assembly, at least a portion of the lug extending beyond the front end of the support table; and e) in the second position of the slide assembly, at least a portion of the lug extending beyond the back end of the support table.

19. The support table assembly of claim 18 wherein the slide assembly supports a plurality of removable lugs.

* * * * *